(12) United States Patent
Muramatsu

(10) Patent No.: US 7,411,124 B2
(45) Date of Patent: Aug. 12, 2008

(54) SELF-CALIBRATING TRANSDUCER SYSTEM AND MUSICAL INSTRUMENT EQUIPPED WITH THE SAME

(75) Inventor: Shigeru Muramatsu, Shizuoka (JP)

(73) Assignee: Yamaha Corporation, Shizuoka-Ken (JP)

( * ) Notice: Subject to any disclaimer, the term of this patent is extended or adjusted under 35 U.S.C. 154(b) by 385 days.

(21) Appl. No.: 11/293,573

(22) Filed: Dec. 2, 2005

(65) Prior Publication Data
US 2006/0162534 A1 Jul. 27, 2006

(30) Foreign Application Priority Data
Jan. 24, 2005 (JP) ............... 2005-015823

(51) Int. Cl.
*G10H 1/00* (2006.01)
(52) U.S. Cl. ............ 84/615; 84/653; 318/400.4; 318/400.08
(58) Field of Classification Search ........... 84/615, 84/653; 318/400.4, 400.08
See application file for complete search history.

(56) References Cited

U.S. PATENT DOCUMENTS

| | | | |
|---|---|---|---|
| 4,351,221 A | | 9/1982 | Starnes et al. |
| 4,429,262 A | * | 1/1984 | Utenick ............ 318/400.12 |
| 5,055,754 A | * | 10/1991 | Kishi et al. ............ 318/565 |
| 5,936,792 A | * | 8/1999 | Kobayashi et al. ....... 360/78.07 |
| 6,057,967 A | * | 5/2000 | Takahashi et al. ........... 359/641 |
| 6,098,322 A | * | 8/2000 | Tozawa et al. ............. 37/414 |
| 6,515,213 B2 | | 2/2003 | Muramatsu et al. |
| 6,744,233 B1 | * | 6/2004 | Tsutsui ................ 318/560 |
| 6,940,005 B2 | | 9/2005 | Muramatsu et al. |
| RE39,076 E | * | 4/2006 | von der Heide et al. .. 318/400.4 |
| 2005/0093490 A1 | * | 5/2005 | Shoji et al. .............. 318/60 |
| 2006/0202655 A1 | * | 9/2006 | Shoji et al. ............. 318/626 |

FOREIGN PATENT DOCUMENTS

| | | |
|---|---|---|
| EP | 1207515 | 5/2002 |
| JP | 06-149234 | 5/1994 |
| JP | 2002-156967 | 5/2002 |
| JP | 2002156967 | 5/2002 |
| WO | WO-03/076951 | 9/2003 |

* cited by examiner

*Primary Examiner*—David S. Warren
(74) *Attorney, Agent, or Firm*—Harness, Dickey & Pierce, PLC

(57) ABSTRACT

A self-calibrating key sensor system is constituted by an optical modulator, optical position transducers, a data accumulator and a data analyzer, and the optical modulator has a gray scale section to produce a key position signal varied together with the keystroke and an absolute data section to produce a calibration signal representative of a strictly adjusted distance between transparent areas of the absolute data section; the data accumulator accumulates discrete values of the calibration signal and discrete values of the key position signal together with the sampling time, and the data analyzer determines the gradient of the key position signal on the basis of peaks of the calibration signal produced at both ends of the strictly adjusted distance so as to estimate the true distance between the rest and end positions.

20 Claims, 5 Drawing Sheets

SELF-CALIBRATING TRANSDUCER SYSTEM AND MUSICAL INSTRUMENT EQUIPPED WITH THE SAME

FIELD OF THE INVENTION

This invention relates to a transducer system and, more particularly, to a transducer system suitable for musical instruments.

DESCRIPTION OF THE RELATED ART

Various hybrid musical instruments are offered to music fans. The hybrid musical instrument is a combination between an acoustic musical instrument and an electric system. Typical examples are disclosed in Japanese Patent Application laid-open Nos. 2002-156967 and Hei 6-149234. The prior art position transducers are of the type converting variation in the amount of incident light to the potential level of an electric signal.

Both prior art position transducers are incorporated in the hybrid pianos, and monitor the hammers of the pianos. Each of the prior art position transducer is constituted by an optical modulator and a photo coupler. The optical modulator is connected to the hammer, and is moved together with the hammer. The photo coupler is supported by the piano cabinet, and is stationary. The photo coupler throws a light beam across the optical modulator, and converts the incident light to photo current.

While the hammer is rotating on the trajectory, the light beam is modulated with the optical modulator, and the amount of incident light is varied together with the current position of the hammer on the trajectory. The amount of photo current is proportionally varied together with the amount of incident light so that the potential level of the electric signal is indicative of the current hammer position. However, the optical modulator and photo coupler, which are physically independent of each other, form in combination the prior art position transducer.

The physically independent component parts are causative of unintentional change in the correlation between the actual hammer position and the potential level of the electric signal. The unintentional change is derived from the environmental influence such as variation of humidity on the wooden hammers, change of the tension exerted on the strings, deterioration of the light sound of the optical coupler, the deflection of the hammer shank, variation of the transparency of the optical modulator and so forth. These phenomena are unavoidable so that a countermeasure is required for the position transducer.

SUMMARY OF THE INVENTION

It is therefore an important object of the present invention to provide a position transducer system, which is self-calibrated for output characteristics. It is also an important object of the present invention to provide a musical instrument equipped with the position transducer system.

To accomplish the object, the present invention proposes to make a data signal correlated with a calibration signal representative of a predetermined value of physical quantity for estimating a value of physical quantity of the data signal at any point on the trajectory.

In accordance with one aspect of the present invention, there is provided a self-calibrating transducer system for converting a physical quantity expressing motion of a manipulator on a trajectory to a data signal comprising a first signal generator producing the data signal, a magnitude of which is representative of the physical quantity on the trajectory, a second signal generator producing a calibration signal, a magnitude of which is representative of a predetermined value of the physical quantity at unique points on the trajectory, a data accumulator connected to the first signal generator and the second signal generator and accumulating a series of values of the magnitude of the data signal on the trajectory, another series of values of the magnitude of the calibration signal and pieces of tag data making the values of the magnitude of the data signal correlated with the values of the magnitude of the calibration signal, a data analyzer connected to the data accumulator, estimating a value of the physical quantity of the data signal at a certain point on the trajectory on the basis of the predetermined value of the physical quantity and a value of the magnitude of the data signal at the certain point and determining a relation between the physical quantity and the magnitude of the data signal along the trajectory so as to memorize the relation therein, and a determiner connected to the data analyzer and the first signal generator and responsive to the data signal so as to determine a value of physical quantity at any point on the trajectory on the basis of the relation.

In accordance with another aspect of the present invention, there is provided a musical instrument for producing tones comprising plural manipulators assigned attributes of tones and independently moved along trajectories, respectively, a tone generating system associated with the plural manipulators and producing the tones having the designated attributes, and a self-calibrating transducer system monitoring the plural manipulators for converting a physical quantity expressing motion of each manipulator on the trajectory to a data signal and including a first signal generator producing the data signal, a magnitude of which is representative of the physical quantity on the trajectory, a second signal generator producing a calibration signal, a magnitude of which is representative of a predetermined value of the physical quantity at unique points on the trajectory, a data accumulator connected to the first signal generator and the second signal generator and accumulating a series of values of the magnitude of the data signal on the trajectory, another series of values of the magnitude of the calibration signal and pieces of tag data making the values of the magnitude of the data signal correlated with the values of the magnitude of the calibration signal, a data analyzer connected to the data accumulator, estimating a value of the physical quantity of the data signal at a certain point on the trajectory on the basis of the predetermined value of the physical quantity and a value of the magnitude of the data signal at the certain point and determining a relation between the physical quantity and the magnitude of the data signal along the trajectory so as to memorize the relation therein and a determiner connected to the data analyzer and the first signal generator and responsive to the data signal so as to determine a value of physical quantity at any point on the trajectory on the basis of the relation.

BRIEF DESCRIPTION OF THE DRAWINGS

The features and advantages of the self-calibrating transducer system and musical instrument will be more clearly understood from the following description taken in conjunction with the accompanying drawings, in which.

DESCRIPTION OF THE PREFERRED EMBODIMENTS

Figure 1:
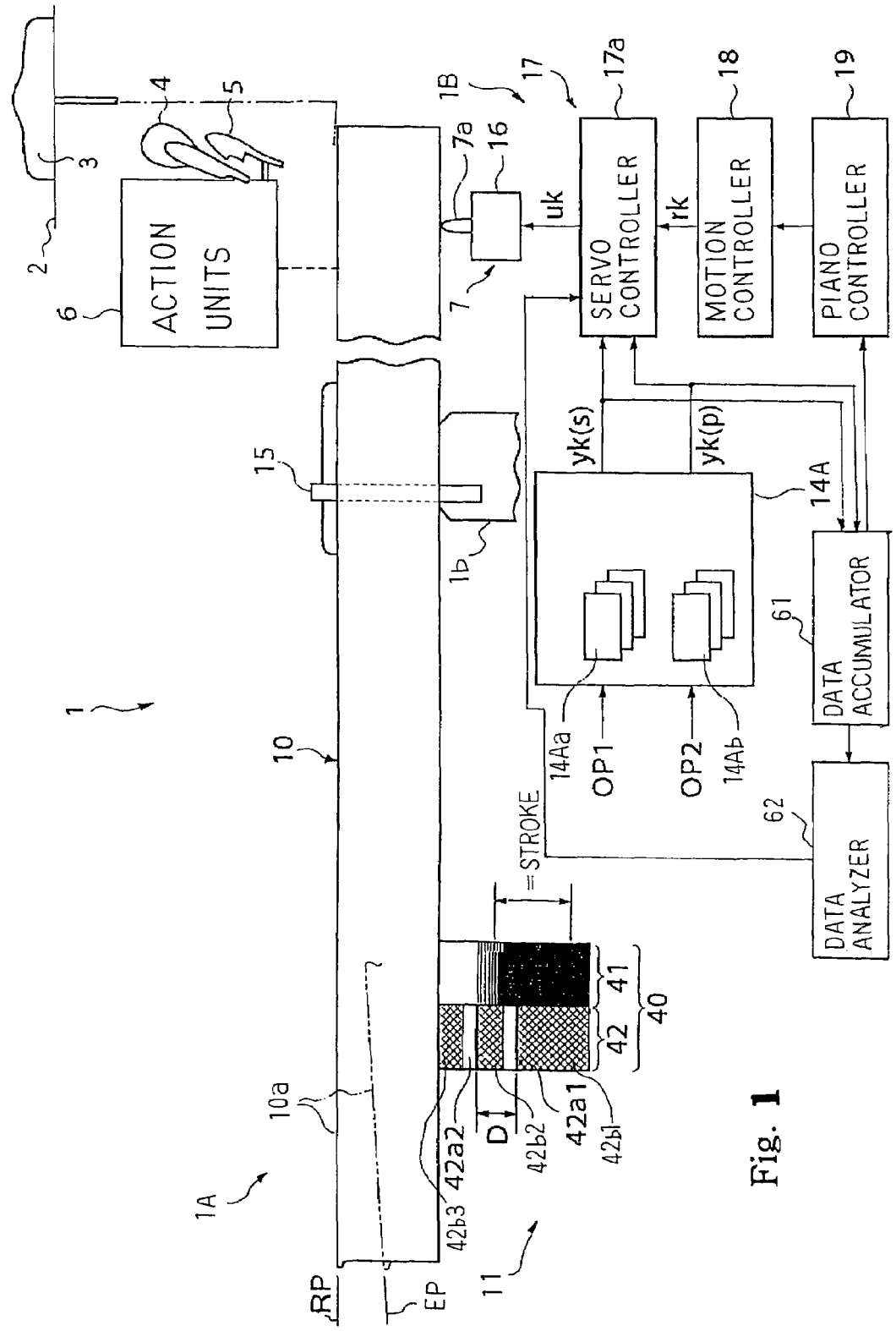
FIG. 1 is a schematic side view showing a position transducer installed in an automatic player piano according to the present invention.

A musical instrument embodying the present invention largely comprises plural manipulators, a tone generating system and a self-calibrating transducer system. The attributes of tones are respectively assigned to the plural manipulators, and the plural manipulators are independently moved on respective trajectories. When a human player selectively manipulates the plural manipulators, the manipulated manipulators are moved along the trajectories, and the attributes to be imparted to the tones are designated by the human player. The pitch names of a scale and effects such as prolongation of tones and reduction of loudness are the attributes, by way of example. In case where the attributes are the pitch names, the human player specifies the pitch names of the tones to be produced by selectively manipulating the plural manipulators. If the attributes are the effects, the human player periodically instructs the tone generating system to impart the designated effect or effects to the tones to be produced.

The tone generating system is associated with the plural manipulators, and produces the tones having the designated attribute or attributes. In case where the human player designates the pitch names through the plural manipulators, the tone generating system produces the tones with the pitch names. On the other hand, when the human player designates an effect through a manipulated manipulator, the tone generating system imparts the effect to the tones. The human player is assumed to designate the prolongation of tones, the tones are prolonged rather than those as usual. If the human player designates the reduction of loudness through another manipulator, the tone generating system softly produces the tones.

The attributes may be designated through pieces of music data. In this instance, the tone generating system produces the tones having the attributes without the manipulation of a human player. The pieces of music data express the designated attributes and other sorts of attributes, and the tone generating system analyzes the pieces of music data so as to produce the tones having the designated attributes with the assistance of the self-calibrating transducer system. Note that the assistance is not only the function of the self-calibrating sensor system. The pieces of music data may be produced by the aid of the self-calibrating transducer system.

The self-calibrating transducer system comprises a first signal generator, a second signal generator, a data accumulator, a data analyzer and a determiner. Both of the first and second signal generators monitor each of the plural manipulators. While the manipulator is traveling on the trajectory, the first signal generator produces a data signal, the magnitude of which is representative of the physical quantity on the trajectory, and supplies the data signal to the data accumulator and determiner. On the other hand, the second signal generator produces a calibration signal, the magnitude of which is representative of a predetermined value of the physical quantity at unique points on the trajectory, and supplies the calibration signal to the data accumulator. However, the calibration signal is not supplied to the determiner.

The self-calibrating transducer system is assumed to calibrate itself. The data accumulator accumulates each value of the magnitude of the data signal and associated value of the magnitude of the calibration signal together with a piece of tag data therein. The piece of tag data may expresses the time at which the first and second signal generators concurrently convert the motion of the manipulator to the value of the magnitude of data signal and the associated value of the magnitude of calibration signal. However, time does not set any limit to the tag data. Any quantity can serve as the tag data in so far as the quantity is absolutely varied regardless of the motion of the manipulator. Thus, the pieces of tag data make the values of the magnitude of the data signal correlated with the values of the magnitude of the calibration signal.

The data analyzer works on the accumulated values so as to determine a relation between the physical quantity and the magnitude of the data signal. Since the magnitude of the calibration signal expresses the predetermined value of the physical quantity at the unique points on the trajectory, a value of the physical quantity at any point on the trajectory is estimable through an arithmetic operation or operations. In detail, the pieces of tag data makes the data signal correlated with the calibration signal, it is possible for the data analyzer to find corresponding values of the magnitude of data signal. The corresponding values are also produced at the unique points on the trajectory. The data analyzer makes the predetermined values of the magnitude of calibration signal mapped on the series of values of the magnitude of data signal, and expands the relation between the physical quantity and the magnitude of the data signal already mapped with the calibration signal over the entire trajectory. Thus, the relation between the physical quantity and the magnitude of the data signal is renewed through the self-calibration. The relation is memorized in the data analyzer.

The self-calibrating transducer system assists the tone generating system as follows. The tone generating system is assumed to give rise to the motion of a manipulator for producing a tone having the designated attribute on the basis of a piece of music data. The first signal generator monitors the manipulator, and supplies the data signal to the determiner, and the determiner determines a current value of the physical quantity through the access to the relation memorized in the data analyzer. The current value of the physical quantity, which expresses the current motion of the manipulator, is reported to the tone generating system so that the tone generating system compares the current motion with the target motion expressed by the piece of music data to see whether or not the manipulator exactly travels on the trajectory. If the answer is affirmative, the tone generating system permits the manipulator to continue the motion. When the answer is negative, the tone generating system causes the manipulator to vary the motion. Thus, the tone generating system produces the tone with the attribute expressed by the piece of music data.

In case where the tone generating system produces pieces of music data, the tone generating system determines the motion of the manipulators on the basis of plural series of values of the magnitude of the data signals, and produces the pieces of music data expressing the attribute or attributes to be imparted to the tones. The pieces of music data may be stored therein, and are processed when a user requests the tone generating system to reproduce the tones. Otherwise, the pieces of music data are supplied to another musical instrument, and the tones are produced through the musical instrument.

As will be understood, the self-calibrating transducer system renews the relation between the physical quantity and the magnitude of the data signal and holds the renewed relation. When the tone generating system produces tones on the basis of pieces of music data or the pieces of music data, the tone generating system exactly determines the motion of the manipulators with reference to the renewed relation.

In the following description, term "front" is indicative of a position closer to a player, who is sitting on a stool for fingering, than a position modified with term "rear". A line drawn between a front position and a corresponding rear position extends in a "fore-and-aft direction", and the fore-and-aft direction crosses a lateral direction at right angle. A vertical direction is normal to a plane defined by the fore-and-aft direction and lateral direction. Term "longitudinal direction" is dependent on the configuration of a part, and the term "longitudinal" is indicative of a direction of length of a part greater than a direction of "width" of the part.

First Embodiment

Referring to FIG. 1 of the drawings, an automatic player piano 1 embodying the present invention largely comprises an acoustic piano 1A and an electric system 1B. A human player plays a music passage on the acoustic piano 1A, and acoustic piano tones are produced along the music passage in the acoustic piano 1A. The electric system 1A serves as an automatic player, and the automatic player plays a music passage on the acoustic piano 1A without the fingering of the human player.

Structure of Acoustic Piano

The acoustic piano 1A includes strings 2, dampers 3, hammers 4, action units 6, which have respective back checks 5, and a keyboard 10. Plural keys 10a are incorporated in the keyboard 10, and independently pitch up and down on a balance rail 1b. In this instance, eighty-eight keys 10a are provided on the keyboard 10. While the player depresses the front portions of the keys 10a, the keys travel on respective trajectories toward the end positions EP. Balance pins 15 upwardly project from the balance rail 1b, and offer fulcrums to the keys 10a. The front portions of the keys 10a stay at the lowest positions, which are referred to as "rest positions" RP, without any force exerted thereon by a player. A human player selectively depresses and releases the front portions of the plural keys 10a along a music passage. The plural keys 10a are linked at the rear portions thereof with the action units 6, and the depressed keys 10a actuate the associated action units 6. The behavior of the action units 6 is well known to persons skilled in the art, and no further description is hereinafter incorporated for the sake of simplicity. The hammers 4 are provided in association with the action units 6, and are rotatably supported by shank flange rail (not shown). While the associated keys 10a are staying at the rest positions RP, the hammers 4 are held in contact with jacks (not shown) of the associated action units 6, and are spaced from back checks 5. The actuated action units 6 force the hammers 4 to rotate until escapes, and gives rise to free rotation at respective the escapes. The strings 2 are spaced from the associated hammers 4 at respective rest positions by a predetermined distance, and are struck with the hammers 4 at the end of the free rotation. The dampers 3 are linked with the rear portions of the keys 10a, and are spaced from and brought into contact with the associated strings 2. While the keys 10a are staying at the rest positions RP, the dampers 3 are held in contact with the associated strings 2, and prohibit the associated strings 2 from vibrations. The rear portions of the keys 10a lift the associated dampers 3 on the way to the end positions EP so that the dampers 3 are spaced from the strings 2. The timing at which the dampers 3 perfectly leave the dampers 3 is after the escapes so that the strings 2 get ready to vibrate before the strikes with the hammers 4.

When the hammers 4 are brought into collision with the associated strings 2, the strings 2 vibrate for producing the acoustic piano tones, and the hammers 4 rebound on the strings 2. The hammers 4 fall, and the associated back checks 5 receive the hammers 4. When the player releases the depressed keys 10a, the keys 10a start to return toward the rest positions RP together with the back checks 5. The hammers 4 are brought into contact with the associated jacks (no shown), again, and the back checks 5 are spaced from the hammers 4. The dampers 3 are brought into contact with the vibrating strings 2 on the way to the rest positions RP, and absorb the vibrations. For this reason, the acoustic piano tones are rapidly extinguished.

System Configuration of Electric System

The electric system 1B includes an array of solenoid-operated key actuators 7, an array of key sensors 11 and a controller 17. Each of the key sensors 11 is implemented by a combination between an optical position transducer 14 and an optical modulator 40. The optical modulator 40 is attached to the lower surface of the front portion of the associated key 10a, and is moved together with the key 10a. On the other hand, the optical modulator is stationary with respect to the key bed (not shown), and converts a current key position on the key trajectory and reference positions also on the key trajectory to a key position signal yk(s) and a calibrating signal yk(p).

The array of solenoid-operated key actuators 7 is provided under the rear portions of the keys 10a, and a key bed (not shown) bears the array of solenoid-operated key actuators 7. The solenoid-operated key actuators 7 are respectively associated with the plural keys 10a, and each of the solenoid-operated key actuators 7 includes a solenoid 16 and 1 plunger 7a. The solenoid 16 is connected to the controller 17, and a driving signal uk flows through the solenoid 16. The plunger 7a is projectable from and retractable into the solenoid 16, and has the tip thereof in the close proximity of the lower surface of the associated key 10a while being retracted.

When the solenoid 16 is being energized with the driving signal uk, a magnetic field is created, and magnetic force is exerted on the plunger 7a. The magnetic force causes the plunger 7a to project upwardly so that the plunger 7a pushes the rear portion of the associated key 10a. Thus, the solenoid-operated key actuators 7 give rises to the key motion without any fingering of a human pianist.

The key sensors 11 are connected to the controller 17 so that the key position signals yk(s) and calibrating signals yk(p) are input into the controller 17. Though not shown in the drawings, a central processing unit, a program memory, a working memory and a signal interface, which are connected to a shared bus system, are incorporated in the controller 17, and a computer program runs on the central processing unit for achieving tasks given by a user.

The computer program is broken down into a main routine program and several sub-routine programs. While the central processing unit reiterates the main routine program, the central processing unit communicates with users through a manipulating panel (not shown). The manipulating panel (not shown) is provided with a display window, indicators and various sorts of switches. The central processing unit produces character images on the display window so as to inform the users of current status and prompt messages. The users give instructions and answers to the central processing unit by manipulating the switches. One of the instructions is to make the electric system 1B reenact a performance expressed by a set of pieces of music data, which is coded in accordance with the MIDI (Musical Instrument Digital Interface) protocols. Another instruction is to carry out a self-calibration. The self-calibration will be hereinlater described in conjunction with the key sensors 11.

Description is made on the behavior of the automatic player piano 1 in a playback mode of operation. A piece of music is produced through an automatic playing, and the automatic playing is carried out in the playback mode of operation. The function of the controller 17 is broken down in a servo controller 17a, a motion controller 18 and a piano controller 19, and is realized through an execution of one of the subroutine programs.

When the user instructs the automatic player 1 to reenact a performance through the manipulating panel (no shown), the main routine program starts periodically to branch to the sub-routine program. Although the following jobs are described as if the central processing unit continuously does the jobs through the subroutine program, the main routine program branches the sub-routine program at every timer interruption, and the subroutine program returns to the main routine program after the central processing unit executes the instructions for a predetermined time period.

The optical position transducers 14 continuously monitor the associated optical modulators 40, and report pieces of key position data expressing the current key positions to the controller 17 through the key position signals yk(s). The current key position is equivalent to a keystroke from the rest position RP. A table has been prepared in the working memory, and memory locations are respectively assigned to the plural keys 10a. The discrete values on the key position signals are periodically sampled and converted to digital key position signals, which also express the pieces of key position data. The pieces of key position data are memorized in the memory locations assigned to the keys 10a together with the time at which the pieces of key position data are fetched. Thus, a predetermined number of pieces of key position data are accumulated in the working memory for each of the plural keys 10a.

The user is assumed to specify a piece of music. A set of music data, which expresses the piece of music, is transferred to the piano controller 19. The piano controller 19 starts a timer to measure the lapse of time, and seeks a piece of music data to be processed.

When the piano controller 19 finds a piece of music data expressing a note-on event, the piano controller 19 specifies the key 10a to be moved, and determines a target trajectory, i.e., a series of values of the target key position varied with time for the target key 10a. The piano controller 19 informs the motion controller 18 of the target key trajectory.

The motion controller 18 measures the time, and periodically renews the value of the target key position on the target key trajectory. The motion controller 18 informs the servo controller 17a of the present value rk of the target key position for the target key 10a.

The servo controller 17a calculates a target key velocity on the basis of the series of values of the target key position rk, and accesses the memory location assigned to the target key 10a. The servo controller 17a reads out the piece of key position data expressing a series of values of the current key position, and calculates a current key velocity on the basis of the series of values of the current key position.

The servo controller 17a compares the current key position with the target key position and the current key velocity with the target key velocity so as to determine a positional difference between the current key position and the target key position and a velocity difference between the current key velocity and the target key velocity. The positional difference and velocity difference are multiplied with a position gain and a velocity gain, and the products are added to each other. The sum of products are indicative of mean current of the driving signal uk. In this instance, a pulse width modulator (not shown) is incorporated in the servo controller 17a, and the pulse width modulator (not shown) adjusts the driving signal uk to a target duty ratio equivalent to the mean current.

The driving signal uk is supplied to the solenoid 16 under the rear portion of the target key 10a. The magnetic force is exerted on the plunger 7a in the magnetic field, and the plunger 7a exerts the force on the rear portion of the target key 10a.

While the target key 10a is traveling on the trajectory, the key sensor 11 reports the current key position to the servo controller 17a through the key position signal yk(s), and the servo controller 17a periodically compares the current key position and current key velocity with the target key position and target key velocity so as force the target key 10a to travel on the target key trajectory.

The target key 10a, which exactly travels on the target key trajectory, makes the associated action unit 6 give rise to the free rotation of the associated hammer 4 at a target hammer velocity. Since the tone is produced from the vibrating string 2 at the loudness proportional to the hammer velocity, the hammer 4 gives rise to the acoustic piano tone at the target loudness through the vibrations of the associated string 2.

When the piano controller 19 finds the piece of music data expressing the note-off event for the target key 10a, the piano controller 19 determines a target backward key trajectory, and the motion controller 18 and servo controller 17 force the target key 10a to travel on the target backward key trajectory. The piano controller 19 sequentially processes the pieces of music data so as to determine the target key trajectories and target backward key trajectories for the keys 10a, and the motion controller 18 and servo controller 17 force the keys 10a to travel on the target trajectories and target backward key trajectories in cooperation with the key sensors 11.

Self-Calibrating Position Transducer System

A self-calibrating position transducer system embodying the present invention comprises the key sensors 11 and controller 17. Another subroutine program runs on the central processing unit for calibrating the key sensors 11. When a user instructs the electric system 1B to calibrate the key sensors 11, the main routine program branches to the subroutine program for the self-calibration.

The subroutine program for the self-calibration is expressed by two function blocks 61 and 62 of the controller 17, i.e., a data accumulator 61 and a data analyzer 62 shown in FIG. 1, and the data accumulator 61 and data analyzer 62 cooperate with the piano controller 19, motion controller 18 and servo controller 17a during the execution of the subroutine program. Since the key sensors 11 deeply concern the data accumulator 61 and data analyzer 62, the key sensors 11 are firstly described, and description on the data accumulator 61 and data analyzer 62 follows.

Figure 2A:
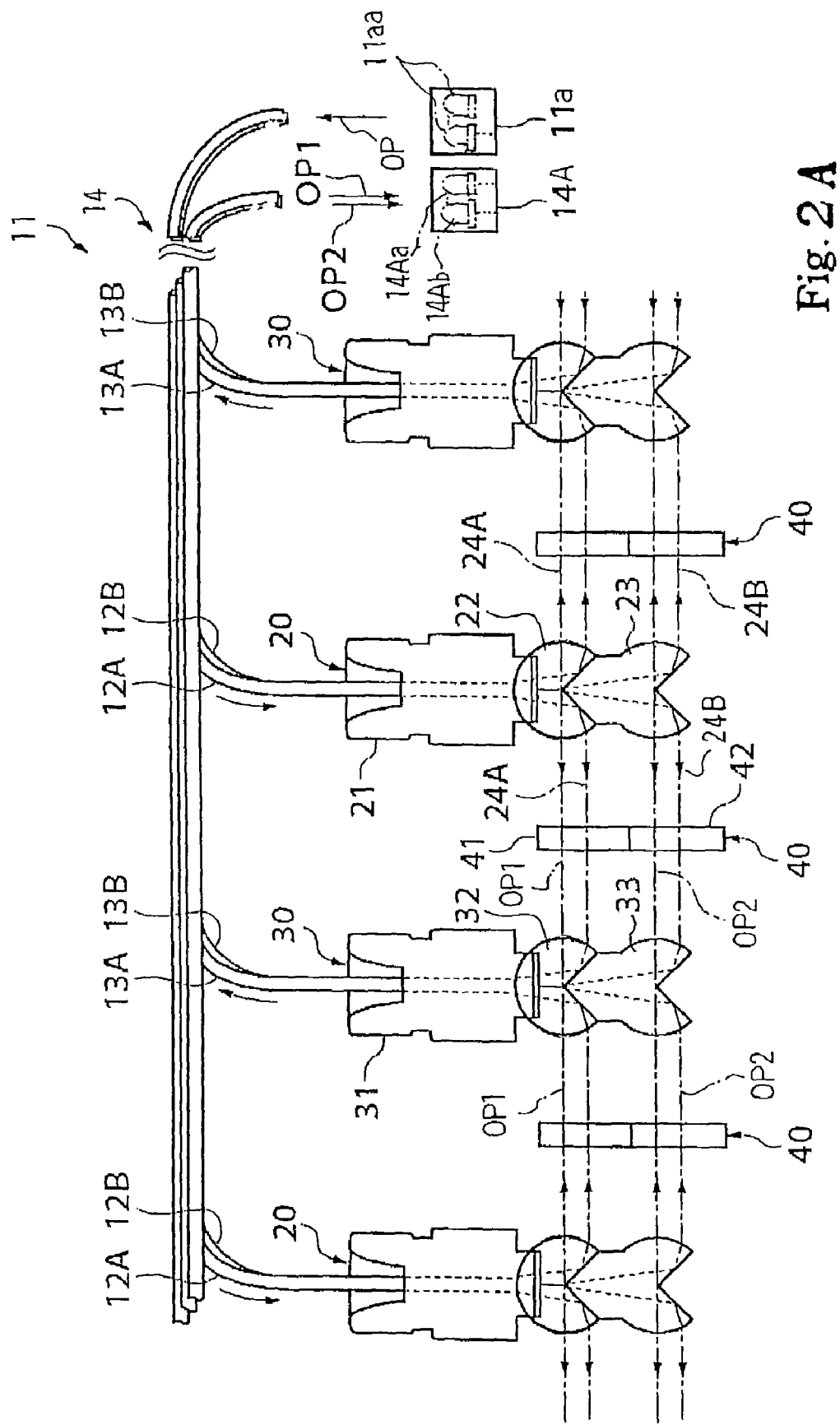
FIG. 2A is a bottom view showing the layout of sensor heads incorporated in optical position transducers of key sensors.
Figure 2:
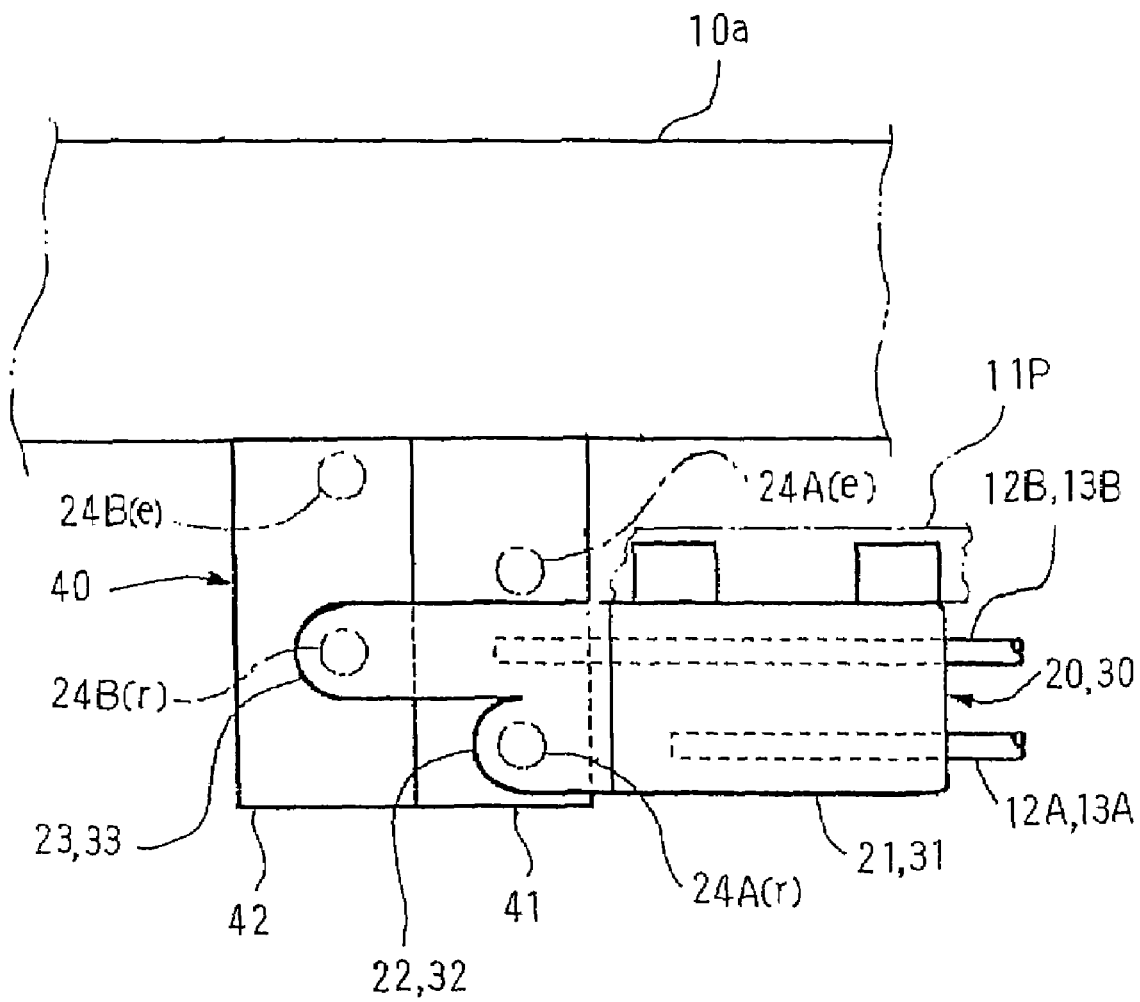
FIG. 2B is a side view showing a relative relation between an optical modulator and the sensor head.

Description is made on the key sensors 11 with concurrent reference to FIGS. 1 and 2. As described hereinbefore, each of the key sensors 11 is implemented by the combination of the optical modulator 40 and optical position transducer 14. The optical modulator 40 is moved together with the associated key 10a, and modulates the light thrown by the optical position transducer 14.

In this instance, the optical modulator 40 is implemented by a filter plate, which has a transparent area and a non-transparent area. The filter plate is hereinafter also labeled with the reference numeral "40". The filter plate 40 is divided into two sections 41 and 42. The filter plate 40 is made from a transparent plate of PET (Poly-Ethylene Terephthalate), and non-transparent black stripes are formed on the transparent plate.

The non-transparent black stripes are spaced from one another at irregular intervals in one of the sections 41, and the irregular intervals are decreased from the lower end toward the key 10a. Thus, a gray scale is formed in the section 41, and the section 41 is referred to as a "gray scale section" 41.

On the other hand, the non-transparent stripes are contiguous to one another in the other section 42, and form three non-transparent areas 42b1, 42b2 and 42b3. The non-transparent area 42b2 is spaced from both non-transparent areas 42b1 and 42b3 so that transparent areas 42a1 and 42a2 take place between the non-transparent area 42b2 and the non-transparent areas 42b1/42b3. The boundary between the non-transparent area 42b1 and the transparent area 42a1 is spaced from the boundary between the non-transparent area 42b2 and the transparent area 42a2 by a predetermined distance. In this instance, the predetermined distance is adjusted to 2 millimeters. The distance between the boundaries is strictly adjusted to the predetermined value, and the section 42 is hereinafter referred to as an "reference data section" 42. It is not necessary strictly adjust the distances from the rest position RP to the boundaries of the transparent areas 42a1 and 42a2.

The key position signals yk(s) are modulated with the gray scale sections 41 on the filter plates 40, and the calibration signals yk(p) are produced through the reference data section 42.

The optical position transducers 14 includes a light emitting unit 11a, pairs of optical fibers 12A/12B, light radiating sensor heads 20, light receiving sensor heads 30, pairs of optical fibers 13A/13B and a light detecting unit 14A. The light radiating sensor heads 20 and light receiving sensor heads 30 are alternately arranged under the array of keys 10a, and are attached to the reverse surface of an upper plate 11P of a photo-shield box. The light radiating sensor heads 20 are spaced from the adjacent light receiving sensor heads 30 by gaps. The optical modulators 40, which are secured to the lower surfaces of the associated keys 10a, project into the photo-shield box through slits (not shown), and travel on the trajectories, which respectively pass through the gaps.

The pairs of optical fibers 12A/12B are grouped into plural bundles, and the plural bundles of pairs of optical fibers 12A/12B are respectively opposed to light emitting elements 11aa, which are provided in the light emitting unit 11a. In this instance, five pairs of optical fibers 12A/12B form one of the plural bundles so that each of the plural light emitting elements 11aa is opposed to the five pairs of optical fibers 12A/12B.

Similarly, the pairs of optical fibers 13A/13B are grouped into plural bundles, and the plural bundles of pairs of optical fibers 13A/13B are respectively opposed to light detecting elements 14Aa/14Ab inside the light detecting unit 14A. In this instance, five pairs of optical fibers 13A/13B form each bundle opposed to each pair of light detecting elements 14Aa/14Ab.

The light emitting elements 11aa are sequentially energized with voltage, and detecting light OP is emitted from each of the light emitting elements 11aa. In this instance, the light emitting elements 11aa are implemented by semiconductor light emitting diodes. The detecting light OP is incident from each light emitting element 11aa onto the pairs of optical fibers 12A/12B of the associated bundle, and is distributed to the light radiating sensor heads 20 through the pairs of optical fibers 12A/12B. The detecting light OP is thrown from the light radiating sensor heads 20 as non-modulated light beams 24A/24B. The non-modulated light beams 24A/24B pass through the optical modulators 40, and modulated light beams OP1/OP2 are fallen onto the light receiving sensor heads 30. The modulated light beams OP1/OP2 are propagated from the light receiving sensor heads 30 to the light detecting unit 14A, and the modulated light beams OP1/OP2 are converted to photo current by means of the associated light detecting elements 14Aa. The photo current serves as the key position signals yk(s) and calibrating signals yk(p). The light detecting elements 14Aa/14Ab are, by way of example, implemented by semiconductor light detecting transistors.

Since the optical position transducers 14 are similar to one another, one of the optical position transducers 14 associated with the key 10a at the center in FIG. 2A is hereinafter described in more detail. Although only three optical position transducers 14 are shown in FIG. 2A, eighty-eight optical position transducers 14 are respectively associated with the eighty-eight keys 10a.

The light radiating sensor head 20 is shared with the right key 10a, and the light receiving sensor head 30 is shared with the left key 10a. For this reason, the non-modulated light beams 24A/24B are directed from the light radiating sensor head 20 in both sideward directions, and the modulated light beams OP1/OP2 are incident on the light receiving sensor head 30 on both sides thereof. As will be hereinlater described, the non-modulated light beams 24A/24B are not concurrently radiated from the light radiating sensor heads on both sides of each light receiving sensor head 30.

The light radiating sensor head 20 and light receiving sensor head 30 are made of transparent synthetic resin such as, for example, acrylic resin. The light radiating sensor head 20 is broken down into a body 21, a first light radiating port 22 and a second light radiating port 23. Nevertheless, the body 21, first light radiating port 22 and second light radiating port 23 have a unitary structure. Each of the light radiating ports 22/23 is formed by a pair of convex lenses, and V-letter shaped light reflecting surfaces take place between the convex lenses. As will be seen in FIG. 2B, the second light radiating port 23 widely projects from the body 21 rather than the first light radiating port 22, and the first light radiating port 22 and second light radiating port 22 are respectively opposed to the gray scale section 41 and reference data section 42, respectively. Two passages are formed in the body 21, and the centerlines of the passages are aligned with the corners of the V-shaped reflecting surfaces. The two passages are respectively assigned to the optical fibers 12A and 12B of the associated pair, and the V-shaped reflecting surfaces are respectively confronted with the end surfaces of the optical fibers 12A/12B in the passages.

While the associated key 10a is staying at the rest positions RP, the non-modulated light beams 24A/24B are fallen on the gray scale section 41 and reference data section 42 at spots 24A(r) and 24B(r) in FIG. 2B, respectively. When the associated key reaches the end position EP, the non-modulated light means 24A/24B are thrown on spots 24A(e) and 24B(e), respectively. While the non-modulated light beam 24B is moved from the spot 24B(r) to the spot 24B (e), the non-modulated light beam 24B travels across the transparent portions 42a1 and 42a2.

The light receiving sensor head 30 is same in configuration with the light radiating sensor head 20, and a body 31, a first light receiving port 32 and a second light receiving port 33 are formed into a unitary structure as similar to the light radiating sensor head 20. For this reason, the portions of the light receiving sensor head 30 are written in FIG. 2A together with the references designating the corresponding portions of the light radiating sensor head 20 without detailed description.

The detecting light OP is assumed to reach the end surfaces of the optical fibers 12A/12B. The detecting light OP is incident on the V-shaped reflecting surfaces, and is split into two pairs of non-modulated light beams 24A/24B. The first light radiating port 22 and second light radiating port 23 make the two pairs of non-modulated light beams 24A/24B parallel light, and the two pairs of non-modulated light means 24A/24B are sidewardly radiated toward the optical modulators 40 on both sides of the light radiating sensor head 20.

Description is continued on the pair of non-modulated light beams 24A/24B fallen on the optical modulator 40 on the left side of the light radiating sensor head 20. The non-modulated light beam 24A is fallen onto the gray scale section 41, and the intensity of the non-modulated light beam 24A is modulated with the optical modulator 40 depending upon the current key position of the associated key 10a. The non-modulated light beam 24B is fallen onto the reference data section 42, and the intensity of the non-modulated light beam 24B is also modulated with the optical modulator 40 depending upon the current key position of the associated key 10a. Thus, both of the non-modulated light beams 24A/24B are modulated with the optical modulator 40 depending upon the current key position in a different manner due to the patterns of black stripes in the sections 41/42.

The modulated light beams OP1/OP2 are fallen on the first and second light receiving ports 32 and 33, respectively. The modulated light beams OP1/OP2 are reflected on the V-shaped reflecting surfaces, and are directed to the end surfaces of the optical fibers 13A/13B. The modulated light beams OP1/OP2 are incident on the end surfaces, and are propagated through the optical fibers 13A/13B to the pair of light detecting elements 14Aa/14Ab. Thus, the modulated light beams OP1/OP2 are converted to photo current by means of the light detecting elements 14Aa/14Ab of the associated pair.

The amount of photo current, which is output from the light detecting element 14Aa, is proportional to the area of the transparent portion of the radiated spot in the gray scale section 41 and, accordingly, to the current key position. The variation of the amount of photo current is converted to variation of potential level of the key position signal yk(s) through a suitable current-to-voltage converter such as a resistor.

Similarly, the amount of photo current, which is output from the light detecting element 14Ab, is proportional to the area of the transparent portion of the radiated spot in the reference data section 42, and the variation of the amount of photo current is converted to variation of potential level of the calibration signal yk (p) through a suitable current-to-voltage converter. The calibration signals yk(p) are representative of pieces of reference data also expressing the potential level and, accordingly, the current key positions or keystroke.

The keys 10a are specified as follows. The following method for specifying the keys 10a is disclosed in Japanese Patent Application laid-open No. Hei 9-152871. The light emitting elements 11aa are periodically energized at time intervals. Each time interval is divided into plural time slots, and the plural time slots are respectively assigned to the plural light emitting elements 11aa. In other words, each light emitting elements 11aa is energized in one of the plural time slots, and the power voltage is removed from each light emitting element 11aa in the time slots assigned to the other light emitting elements 11aa. Thus, the detecting light OP is sequentially emitted from the plural light emitting elements 11aa as light pulses.

Although the light pulse is incident into the plural pairs of optical fibers 12A/12B, the plural pairs of optical fibers 12A/12B are terminated at the associated light radiating sensor heads 20, which are spaced from one another by other light radiating sensor heads 20. In other words, the light radiating sensor heads 20, which are only spaced by the light receiving sensor heads 30, are assigned the different time slots. As a result, two pairs of non-modulated light beams 24A/24B are not concurrently incident on any one of the light receiving sensor heads 30.

The plural pairs of non-modulated light beams 24A/24B, which are concurrently radiated in a certain time slot, are incident on the associated light receiving sensor heads 30 as the plural pairs of modulated light beams OP1/OP2, and the plural pairs of modulated light beams OP1/OP2 are converted to the key position signals/calibrating signals yk(s)/yk(p) in the certain time slots. When the two pairs of non-modulated light beams 24A/24B are concurrently radiated from the right light radiating sensor head 20 shown in FIG. 2A, the two pairs of modulated light beams OP1/OP2 are respectively incident on the light receiving sensor heads 30 on both sides of the right light radiating sensor head 20, and the two pairs of optical fibers 13A/13B are propagated to the different two pairs of light detecting elements 14Aa/14Ab. Thus, the plural time slots and plural pairs of light detecting elements 14Aa/14Ab form a large number of combinations, which are respectively assigned to the eighty-eight keys 10a. The relation between the combinations and the key numbers Kn is stored in the read only memory in the controller 17. When the controller 17 fetches the pieces of key position data in one of the time slots, the controller determines the combinations between the time slot and the analog-to-digital converters assigned to the pairs of light receiving sensor heads 14Aa/14Ab, and reads out the key numbers Kn corresponding to the combinations from the read only memory. Thus, the controller 17 accumulates the pieces of key position data and pieces of time data for each of the plural keys 10a.

A user is assumed to instruct the electric system 1B to calibrate the key sensors 11. The data accumulator 62 supplies pieces of test data to the piano controller 19, and requests the piano controller 19 to move the keys 10a along linear test trajectories, respectively. The piano controller 19 determines the linear test trajectories on the basis of the pieces of test data, and informs the motion controller 18 of the linear test trajectories. The motion controller 18 cooperates with the servo controller 17a as similar to those in the above-described playback so that the keys 10a sequentially travel on the linear test trajectories by the aid of the solenoid-operated key actuators 7.

While the keys 10a are traveling on the linear test trajectories between the rest positions RP and the end positions EP, the key sensors 11 produce the key position signals yk(s) and calibration signals yk(p), and supplies the key position signals yk(s) and calibration signals yk(p) to both of the servo controller 17a and data accumulator 61. The servo controller 17a carries out the servo control on the keys 10a by using the key position signals yk(s) as described in conjunction with the playback.

The data accumulator 61 fetches the pieces of position data represented by the key position signals yk(s) and pieces of reference data represented by the calibration signals yk(p) at each time to fetch the data. The data accumulator 61 specifies the key numbers Kn assigned to the keys 10a on the linear test trajectories, and reads out the present time. The data accumulator 61 stores each pair of piece of key position data and piece of calibration data together with the piece of time data expressing the present time in predetermined memory location assigned to the associated key 10a. Thus, the data accumulator 61 accumulates the pieces of key position data, pieces of reference data and pieces of time data in the memory for all the keys 10a.

The data analyzer 62 analyzes the pieces of key position, calibration and time data for determining output characteristics of the key sensors 11, i.e., a relation between the potential level of the key position signal yk(s) and the keystroke as follows.

Figure 3A:
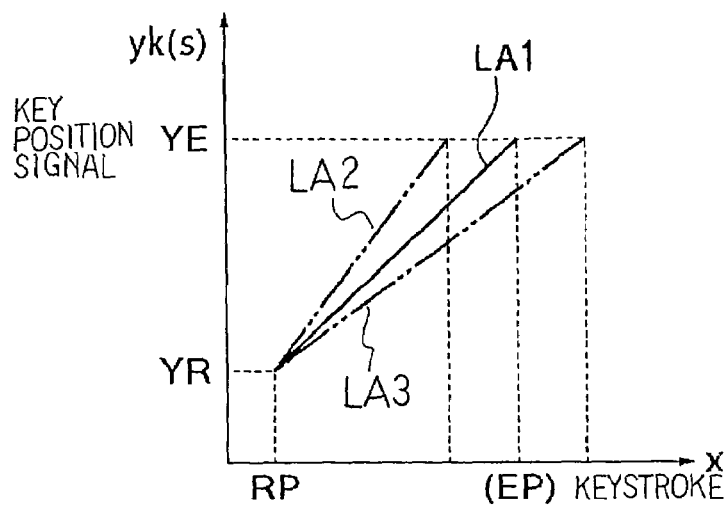
FIG. 3A is a graph showing relations between a keystroke and the potential level of a key position signal determined through key motion on a test trajectory.
Figure 3B:
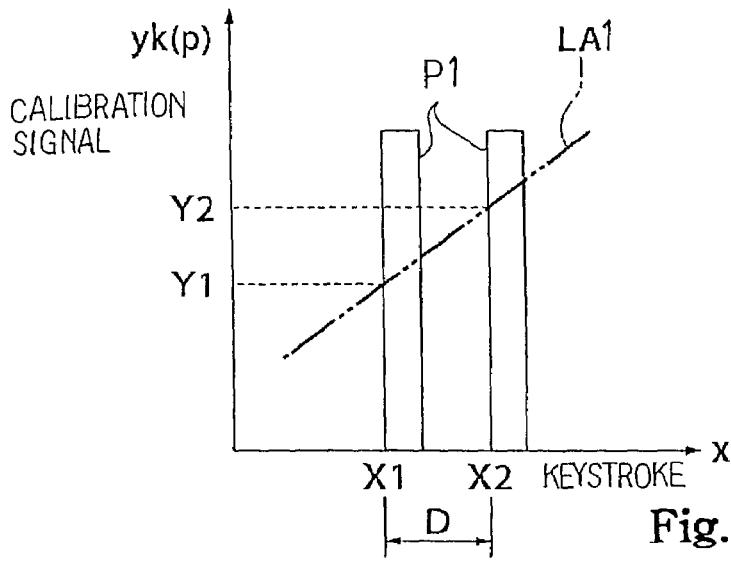
FIG. 3B is a graph showing a relation between the keystroke and the potential level of a calibration signal.

FIGS. 3A and 3B show a relation between the keystroke x and the potential level of the key position signal yk(s) and a relation between the keystroke x and the potential level of the calibration signal yk(p), respectively. When one of the keys 10a is moved from the rest position RP to the end position EP, the potential level of the key position signal yk(s) is varied from YR to YE together with the keystroke x, and the potential level of the calibration signal yk(p) is abruptly raised at the keystroke X1 and the keystroke X2. In other words, the calibration signal yk(p) is twice raised like pulses P1. In the following description, the optical position transducers 11 is assumed to vary the potential level of the key position signals yk(s) and calibration signals yk(p) linearly to the keystroke x.

Although the potential level YR at the rest position RP and the potential level YE at the end position EP are known, the keystroke x between the rest position RP and the end position EP is uncertain, because the acoustic piano 1A has own individuality. In other words, the keystroke x between the rest position RP and the end position EP is different among the keys 10a and acoustic pianos. If the end position is found at (EP) on the abscissa in FIG. 3A, the relation between the potential level and the keystroke x is expressed as plots LA1. However, if the full keystroke is shorter than or longer than the distance between the rest position RP and the end position EP, the end position is to be found on the left side or right side of the (EP), and the relation is expressed as plots LA2 or LA3. Thus, the potential level YR at the rest position RP and potential level YE at the end position EP do not permit the data analyzer 62 to determine the true distance between the rest position RP and the end position EP. The keystroke x and potential level at the rest and end positions YR and EP are variable due to the aged deterioration of the optical position transducers 14 and environmental influences. In other words, the relation between the potential level and the keystroke x is to be renewed for the key sensors 11. In this situation, the abrupt potential rises makes it possible to determine the true distance or full keystroke x between the rest position RP and the end position EP. For better understanding, the pieces of key position data and pieces of reference data are hereinafter also labeled with "yk(s)" and "yk(p), respectively.

The data analyzer 62 searches the memory to see what piece of reference data exceeds a threshold. The data analyzer 62 finds the pieces of reference data at X1 and X2. In other words, the potential level of the calibration signal yk(p) is abruptly raised at keystroke X1 and keystroke X2, and the boundary between the non-transparent area 42b1 and the transparent area 42a1 and boundary between the non-transparent area 42b2 and the transparent area 42a2 are corresponding to X1 and X2, respectively. The boundary between the non-transparent area 42b1 and the transparent area 42a1 is spaced from the boundary between the non-transparent area 42b2 and the transparent area 42a2 by the predetermined distance D. For this reason, the difference between the keystroke X1 and the keystroke X2 is equal to the distance D.

Subsequently, the data analyzer 62 specifies the pieces of time data at which the pieces of reference data exceed the threshold, and reads out the pieces of key position data yk(s), which are accumulated concurrently with the pieces of reference data yk(p) at the keystroke X1 and the keystroke X2. The pieces of key position data yk(s) are indicated by Y1 and Y2 in FIG. 3B. If the plots LA1 express the true relation between the potential level of the key position signal yk(s) and the keystroke x, the pieces of key position data Y1 and Y2 are to be found on plots LA1. However, if the plots LA2 or LA3 stand for the true relation, the pieces of key position data Y1 and Y2 are to be found on the plots LA2 or LA3.

Subsequently, the data analyzer 62 determines the gradient of the linear line drawn between Y1 and Y2. In detail, the data analyzer 62 subtracts the value of the piece of key position data Y1 from the value of the piece of key position data Y2, and divides the difference (Y2−Y1) by the predetermined distance D. The product is indicative of the gradient. The data analyzer 62 increments the potential level of the key position signal yk(s) by (Y2−Y1)/D, and compares the sum (yk(s)+(Y2−Y1)/D) with the potential level YE. If the sum is found out of a neighborhood of the potential level YE, the data analyzer 62 repeats the increment and comparison. In other words, the data analyzer 62 extends the line drawn from the potential level YR at the rest position RP. When the sum is fallen within the neighborhood, the analyzer decides that the key 10a reaches the end position, and determines the full keystroke k. For example, the data analyzer 62 multiples the predetermined distance D by (tE−tR)/(t2−t1) where t1 and t2 are the time at which the Y1 and Y2 are accumulated and (tE−tR) is the product between the number of repetition and the unit time.

Figure 3C:
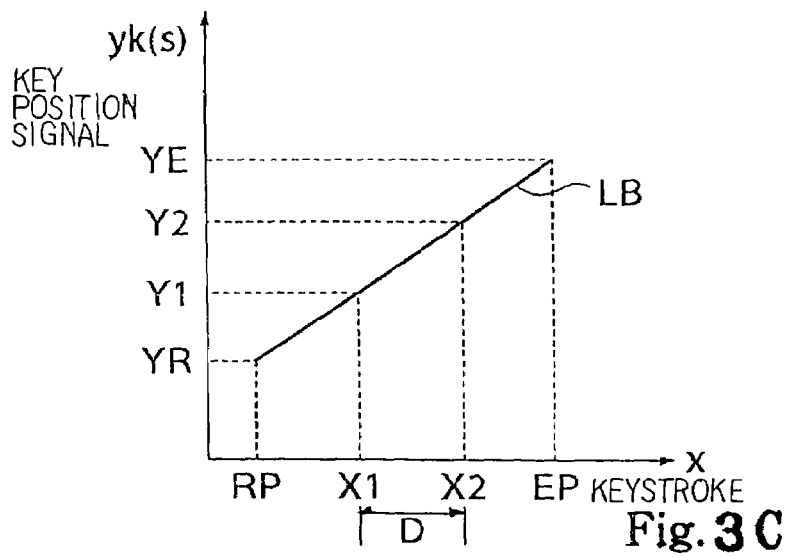
FIG. 3C is a graph showing output characteristics of key sensors determined through the self-calibration.

As a result, the potential level yk(s)-to-keystroke characteristics of the key sensor 11 are expressed as plots LB in FIG. 3C for the target key 10a. The calibration work is repeated for the other keys 10a so that the potential level-to-keystroke characteristics are determined for all the optical position transducers 14. The potential-to-keystroke characteristics are memorized in a non-volatile memory such as, for example, a flash memory.

As described hereinbefore, the potential level-to-keystroke characteristics are unavoidably varied with time so that the controller 17 executes the sub-routine program for the calibration before the difference becomes serious. When the acoustic piano 1A is tuned, the tuner or user instructs the calibration through the manipulating panel (not shown).

While the electric system 1B is reenacting a performance, the servo controller 17a accesses the non-volatile memory with the potential level of the key position signal yk(s), and determines the current key position on the basis of the potential level-to-keystroke characteristics LB for the servo control.

As will be appreciated from the foregoing description, the optical position transducers 14 produces not only the key position signals yk(s) but also the calibration signal yk(p), and the data accumulator 61 and data analyzer 62 determine the true output characteristics LB of the optical position transducers 14. While the electric system 1B is selectively depressing and releasing the keys 10a, the servo controller 17a exactly determines the current key position and current key velocity so as to force the keys 10a to travel on the target key trajectories. This results in the playback at high fidelity.

In case where the electric system 1B serves as a recorder, the controller 17 exactly determines the key motion of the depressed keys 10a and key motion of the released keys 10a on the basis of the pieces of key position data, and produces a set of music data codes expressing the performance on the acoustic piano 1A.

While a tuner is working on the acoustic piano 1A, the tuner may monitor the key motion on a display, and exactly tunes the keys 10a at the rest and end positions RP/EP.

In the above-described embodiment, the gray scale section 41 and absolute data section 42 are formed on a single plate so that the pieces of position data yk(s) are strictly linked with the pieces of reference data yk(p).

Second Embodiment

Figure 4:
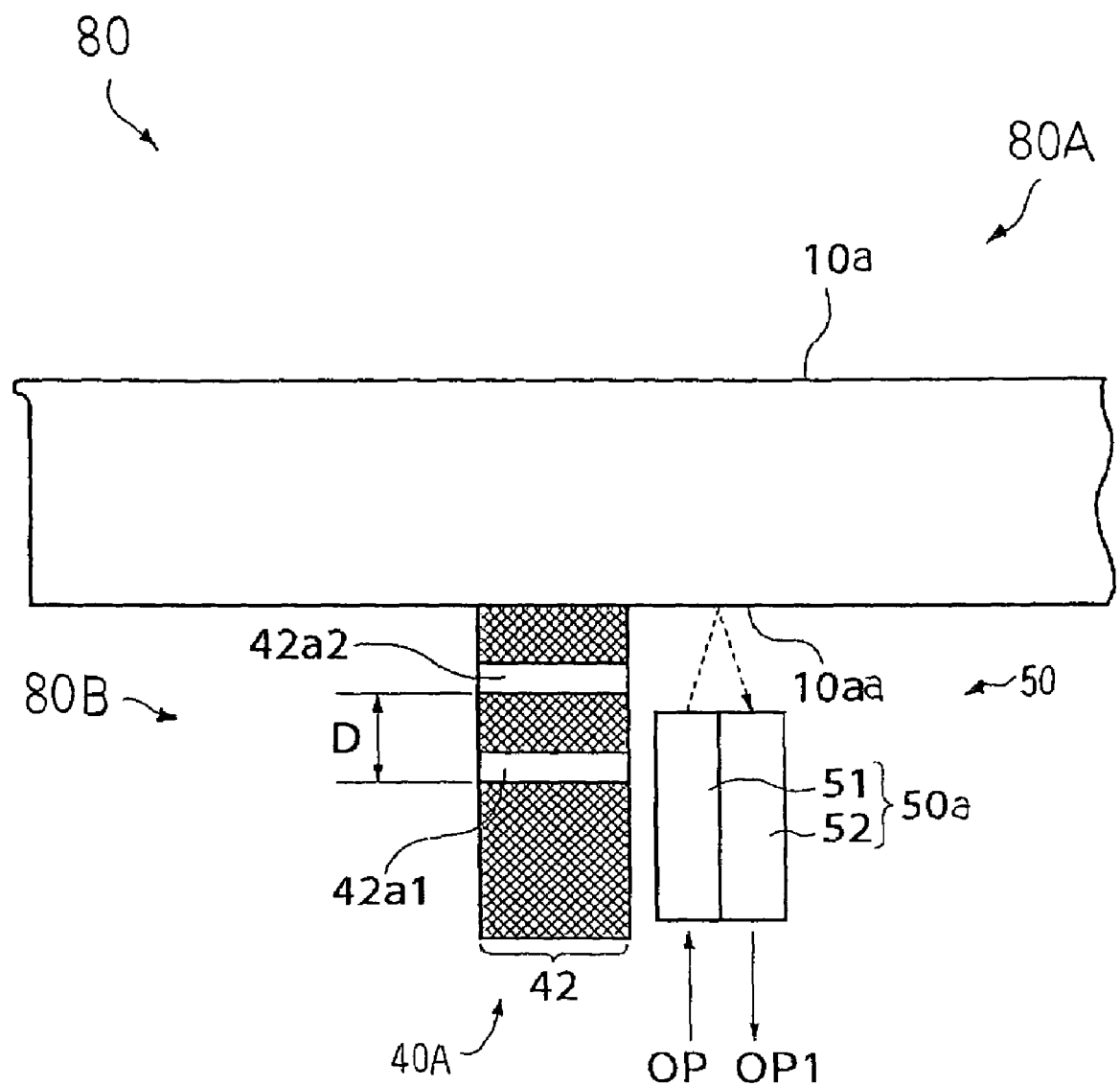
FIG. 4 is a schematic side view showing another key sensor according to the present invention.

Turning to FIG. 4 of the drawings, a position transducer system embodying the present invention is used in monitoring key motion in an automatic player piano 80. The automatic player piano 80 largely comprises an acoustic piano 80A and an electric system 80B. The acoustic piano 80A and electric system 80B are similar to the acoustic piano 1A and electric system 1B except for optical position transducers 50 and optical modulators 40A. The optical position transducer 50 is similar to the optical position transducer 14 except for a reflection type sensor head unit 50a and an optical modulator 40A. The light emitting unit 11a, pairs of optical fibers 12A/12B, pairs of optical fibers 13A/13B and light detecting unit 14A also form parts of the optical position transducers 50. However, light radiating sensor heads and light receiving sensor heads have only the second light radiating ports 23 and second light receiving ports 33. In other words, the first light radiating ports 22 and first light receiving ports 32 are eliminated from the light radiating sensor heads and light receiving sensor heads of the optical position transducer 50. Accordingly, the optical modulator 40A is formed with the absolute data section 42 only, and any gray scale section is not incorporated in the optical modulator 40A.

The first light radiating port 22 and first light receiving port 32 of each optical position transducer 14 are replaced with a light radiating head 51 and a light receiving head 52, which form in combination the reflection type optical sensor head unit 50a. The optical fibers 12A and 13A are connected to the light radiating head 51 and light receiving head 52, respectively. The detecting light OP is radiated from the light radiating head 51 toward the lower surface 10aa of the key 10a as an optical beam, and the reflection OP1 is incident on the light receiving head 52. While the key 10a is traveling on a target trajectory or test trajectory, the intensity of the reflection is varied together with the current key position. Since the optical modulator 40A is secured to the lower surface 10aa of the key 10a, the motion of the optical modulator 40A is linked with the key motion, and the amount of incident light or the intensity of the reflection OP1 is varied together with the incident light OP2.

The functions of the electric system 80B are similar to those of the electric system 1B, and the calibration is carried out as similar to that of the first embodiment. For this reason, the advantages of the first embodiment are also achieved by the second embodiment.

Although particular embodiments of the present invention have been shown and described, it will be apparent to those skilled in the art that various changes and modifications may be made without departing from the spirit and scope of the present invention.

The data accumulator 61 may repeat the data acquisition on the linear test trajectories so that the data analyzer 62 determines the output characteristics LB on the basis of the plural sets of pieces of key position data yk(s) and pieces of reference data yk(p). The plural sets of data may be averaged for eliminating errors from the pieces of key position data yk(s) and pieces of reference data yk(p).

The output characteristics may be expressed as a non-linear line in so far as the non-linear line is expressed as a known equation. This means that the ration of transparent area and non-transparent area is non-linearly varied on the gray scale section.

The optical position transducers 14 according to the present invention may be used for other component parts of the acoustic piano 1A such as, for example, the hammers 4, plungers 7a and pedals (not shown). In case where the optical position transducers 14 are associated with the hammers 4, a tuner adjusts regulating buttons (not shown) to make the jacks escape at proper points on the hammer trajectories. Moreover, the tuner may regulate the back checks 5 to proper height on the basis of the pieces of hammer data.

The automatic player piano does not set any limit to the technical scope of the present invention. The self-calibrating sensor system according to the present invention may be incorporated in another sort of keyboard musical instrument such as, for example, a mute piano or an electronic piano. Moreover, the keyboard musical instrument does not set any limit to the technical scope of the present invention. The self-calibrating sensor system may be incorporated in a percussion instrument such as, for example, a celesta.

The two transparent areas 42a1 and 42a2 do not set any limit to the present invention. An absolute data section may have three transparent areas so that the data analyzer determines the gradient as an average between the gradient between the first and second transparent areas and the gradient between the second and third transparent areas. Otherwise, another absolute data section may have only one transparent spaced from the rest position by a predetermined distance.

The transparent areas 42a1 and 42a2 may be implemented by slits formed in a metal plate. In this instance, the metal plate offers the non-transparent areas 42b1, 42b2 and 42b3.

The reflection type sensor head unit 50a and optical fibers 12A and 13A may be replaced with a reflection type photo coupler. Similarly, the light radiating sensor heads, light receiving sensor heads, optical fibers 12A/12B and 13A/13B, light emitting unit 11a and light detecting unit 14A may be replaced with plural transparent type photo couplers.

The optical position transducers do not set any limit to the technical scope of the present invention. Hall elements and pieces of permanent magnet may serve as the position transducers. For example, plural pieces of permanent magnet are embedded in the side surface portions of a key along a trajectory, and a Hall device is opposed to the trajectory. The pieces of permanent elements are spaced from one another by a known distance. While the key is traveling from the rest position toward the end position, the Hall device varies the potential level, and plural peaks take place. Thus, the plural pieces of permanent magnet and Hall device behave as similar to the absolute data section 42, light emitting element 11aa, optical fibers 12B and 13B, light radiating port 23, light receiving port 33 and light detecting element 14Aa.

The position transducers do not set any limit on the technical scope of the present invention. Velocity sensors or acceleration sensors may be used in the key sensor system. This is because of the fact that these sorts of physical quantity are able to be converted from one to another. A coil and permanent magnet rod may form in combination the velocity sensor, and a semiconductor acceleration sensor, in which a Wheatstone bridge circuit is integrated together with a weight piece, may serve as the acceleration sensor. The key motion may be expressed as variation of electrostatic capacitance. Thus, any sort of sensors is available for the system in so far as the sensors convert the physical quantity expressing the key motion to electric signals.

The data analyzer may estimate the keystroke x at another position between the rest position RP and the end position EP. Thus, the full keystroke does not set any limit to the technical scope of the present invention. In the embodiments described hereinbefore, the data analyzer repeatedly increments the potential level, and compares the result with the potential level YE at the end position EP. However, the arithmetic operations do not set any limit to the method for the estimation. The distance between the rest position RP and the end position EP may be calculated through a proportional distribution.

The component parts of the first and second embodiments are correlated with claim languages as follows.

The keystroke x and keys 10a are corresponding to a "physical quantity" and a "manipulator", respectively, and the key position signal yk(s) and reference signal yk(p) serve as a "data signal" and a "reference signal", respectively. The light emitting element 11a, optical fiber 12A, first light radiating port 22, first light receiving port 32, optical fiber 13A, light detecting element 14Aa and gray scale section 41 as a whole constitute a "first signal generator" in the first embodiment, and the light emitting element 11a, optical fiber 12A, light radiating head 51, light receiving head 52, optical fiber 13A, light detecting element 14Aa and lower surface 10a a as a whole constitute the "first signal generator" in the second embodiment. The light emitting element 11a, optical fiber 12B, second light radiating port 23, second light receiving port 33, optical fiber 13B, light detecting element 14Aa and absolute data section 42 form in combination a "second signal generator". The key position signal yk(s) is corresponding to a "data signal", and the pieces of time data serve as "tag data". The predetermined distance D is a "predetermined value" of the physical quantity, and the values X1 and X2 of the keystroke are corresponding to "unique points". The end position EP is corresponding to a "certain point" on the trajectory.

The combination of the light emitting element 11aa, optical fibers 12A and first light radiating port 22 or the combination of the light emitting element 11aa, optical fiber 12A and light radiating head 51 as a whole constitute a "generator" of the first signal generator, and the gray scale section 41 or lower surface 10a a serves as a "modulator". The combination of the first light receiving port 32, optical fiber 13A and light detecting element 14Aa or the combination of the light receiving head 52, optical fiber 13A and light detecting element 14Aa as a whole constitute a "converter" of the first signal generator.

The light emitting element 11aa, second light radiating port 23 and optical fiber 12B as a whole constitute a "generator" of the second signal generator, and the second light receiving port 33, optical fiber 13B and light detecting element 14Ab form in combination a "converter" of the second signal generator. The absolute data section 42 serves as a "modulator" of the second signal generator. The non-transparent areas 42b1, 42b2 and 42b3 form a "remaining portion".

The plural keys 10a are corresponding to "plural manipulators", and the strings 2, dampers 3, hammers 4, action units 6 and solenoid-operated key actuators 7 as a whole constitute a tone generating system.

What is claimed is:

1. A self-calibrating transducer system for converting a physical quantity expressing motion of a manipulator on a trajectory to a data signals, comprising:
   a first signal generator producing said data signal, a magnitude of which is representative of said physical quantity on said trajectory;
   a second signal generator producing a calibration signal, a magnitude of which is representative of a predetermined value of said physical quantity at unique points on said trajectory;
   a data accumulator connected to said first signal generator and said second signal generator, and accumulating a series of values of said magnitude of said data signal on said trajectory, another series of values of said magnitude of said calibration signal and pieces of tag data making the values of said magnitude of said data signal correlated with the values of said magnitude of said calibration signal;
   a data analyzer connected to said data accumulator, estimating a value of said physical quantity of said data signal at a certain point on said trajectory on the basis of said predetermined value of said physical quantity and a value of said magnitude of said data signal at said certain point, and determining a relation between said physical quantity and said magnitude of said data signal along said trajectory so as to memorize said relation therein; and
   a determiner connected to said data analyzer and said first signal generator, and responsive to said data signal so as uniquely to make values of said magnitude of said data signal correspond to values of physical quantity of said manipulator at any point on said trajectory with reference to said relation memorized in said data analyzer.

2. The self-calibrating transducer system as set forth in claim 1, in which said first signal generator includes
   a generator radiating a flux across said trajectory,
   a modulator connected to said manipulator so as to modulate said flux, and
   a converter converting the modulated flux to said data signal.

3. The self-calibrating transducer system as set forth in claim 2, in which said generator includes
   a light emitting element producing detecting light from electric power,
   a light radiating port for radiating said detecting light as a light beam serving as said flux, and
   an optical fiber connected between said light emitting element and said light radiating port.

4. The self-calibrating transducer system as set forth in claim 3, in which said light radiating port further radiates said detecting light as another light beam toward another modulator attached to another manipulator so that said manipulator shares said light radiating port with said another manipulator.

5. The self-calibrating transducer system as set forth in claim 2, in which said modulator has a gray scale so as to modulate said flux.

6. The self-calibrating transducer system as set forth in claim 2, in which a surface of said manipulator serves as said modulator.

7. The self-calibrating transducer system as set forth in claim 2, in which said converter includes a light receiving port receiving a modulated light beam as said flux passing through said modulator a light detecting element converting said modulated light beam to photo current serving as said data signal, and an optical fiber connected between said light receiving port and said light detecting element.

8. The self-calibrating transducer system as set forth in claim 7, in which said light receiving port further receiving another modulated light beam modulated through another modulator attached to another manipulator so that said manipulator shares said light receiving port with said another manipulator.

9. The self-calibrating transducer system as set forth in claim 1, in which said second signal generator includes a generator radiating a flux across said trajectory, a modulator connected to said manipulator so as to modulate said flux, and a converter converting the modulated flux to said data signal.

10. The self-calibrating transducer system as set forth in claim 9, in which said generator includes a light emitting element producing detecting light from electric power, a light radiating port for radiating said detecting light as a light beam serving as said flux, and an optical fiber connected between said light emitting element and said light radiating port.

11. The self-calibrating transducer system as set forth in claim 10, in which said light radiating port further radiates said detecting light as another light beam toward another modulator attached to another manipulator so that said manipulator shares said light radiating port with said another manipulator.

12. The self-calibrating transducer system as set forth in claim 9, in which said modulator is formed with said unique points different in transparency from a remaining portion so that said flux is at least once modulated at each of said unique points.

13. The self-calibrating transducer system as set forth in claim 12, in which said unique points are implemented by a boundary between a transparent portion and said remaining portion and another boundary between another transparent portion and said remaining portion.

14. The self-calibrating transducer system as set forth in claim 13, in which said boundary is spaced from said another boundary by a predetermined distance so that said relation expresses said magnitude of said data signal varied together with a current position of said manipulator on said trajectory.

15. The self-calibrating transducer system as set forth in claim 1, in which said physical quantity is a distance between a current position of said manipulator and an origin on said trajectory.

16. The self-calibrating transducer system as set forth in claim 15, in which said data analyzer determines an increment of said magnitude of said data signal at a unit value of said distance, and estimates a value of said distance at said certain point on said trajectory as said value of said physical quantity.

17. The self-calibrating transducer system as set forth in claim 9, in which said converter includes a light receiving port receiving a modulated light beam as said flux passing through said modulator, a light detecting element converting said modulated light beam to photo current serving as said data signal, and an optical fiber connected between said light receiving port and said light detecting element.

18. The self-calibrating transducer system as set forth in claim 17, in which said light receiving port further receiving another modulated light beam modulated through another modulator attached to another manipulator so that said manipulator shares said light receiving port with said another manipulator.

19. A musical instrument for producing tones, comprising:

plural manipulators respectively assigned attributes of tones, and independently moved along trajectories, respectively;

a tone generating system associated with said plural manipulators, and producing said tones having the designated attributes; and a self-calibrating transducer system monitoring said plural manipulators for converting a physical quantity expressing motion of each manipulator on the trajectory to a data signal, and including a first signal generator producing said data signal, a magnitude of which is representative of said physical quantity on said trajectory, a second signal generator producing a calibration signal, a magnitude of which is representative of a predetermined value of said physical quantity at unique points on said trajectory, a data accumulator connected to said first signal generator and said second signal generator and accumulating a series of values of said magnitude of said data signal on said trajectory, another series of values of said magnitude of said calibration signal and pieces of tag data making the values of said magnitude of said data signal correlated with the values of said magnitude of said calibration signal, a data analyzer connected to said data accumulator, estimating a value of said physical quantity of said data signal at a certain point on said trajectory on the basis of said predetermined value of said physical quantity and a value of said magnitude of said data signal at said certain point and determining a relation between said physical quantity and said magnitude of said data signal along said trajectory so as to memorize said relation therein, and a determiner connected to said data analyzer and said first signal generator and responsive to said data signal so as uniquely to make values of said magnitude of said data signal correspond to values of physical quantity of said manipulator at any point on said trajectory with reference to said relation memorized in said data analyzer.

20. The musical instrument as set forth in claim 19, in which keys and a combination of action units, hammers, strings and key actuators serve as said plural manipulators and said tone generating system so that said musical instrument is fabricated on the basis of an acoustic piano.

* * * * *